(No Model.) 2 Sheets—Sheet 2.

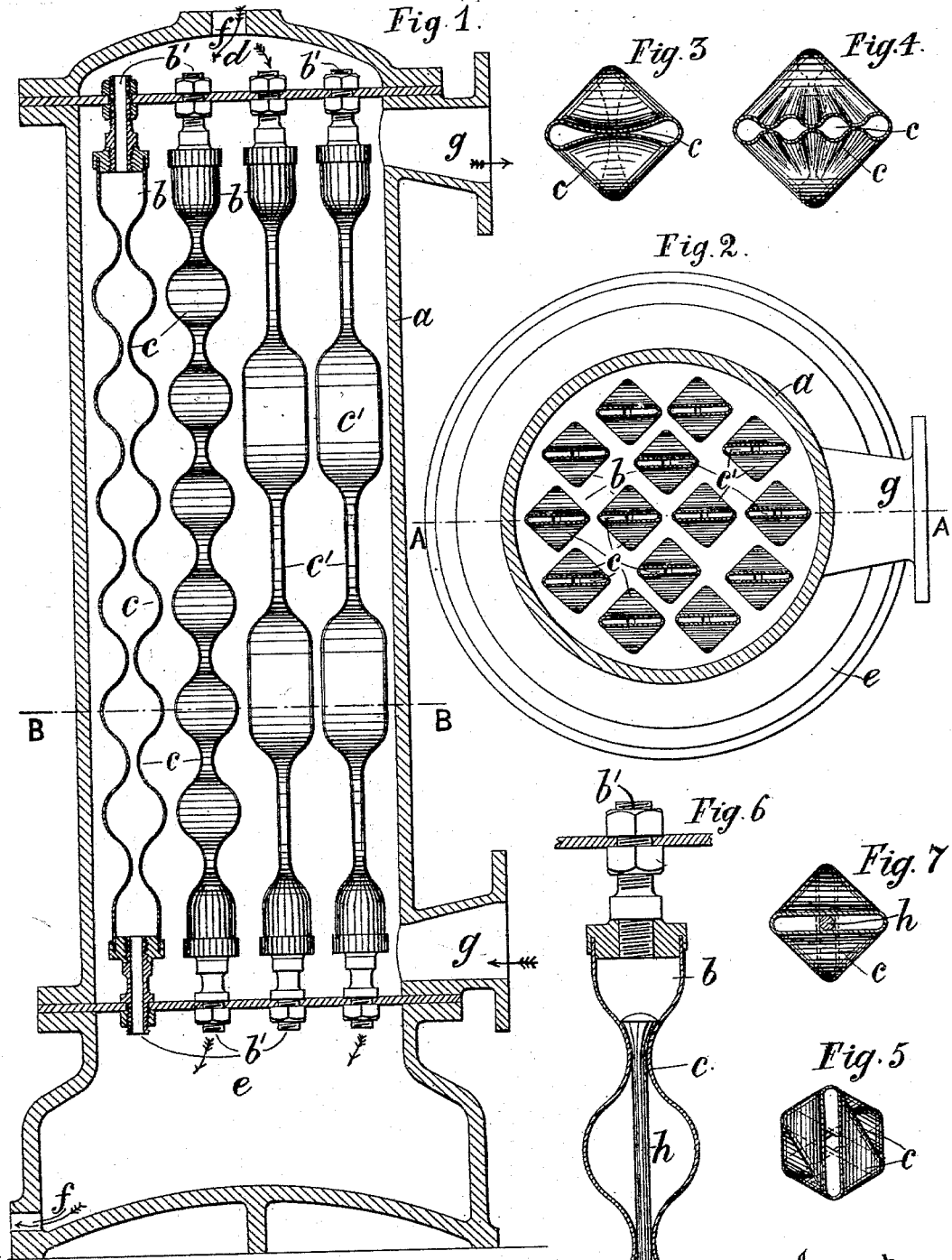

O. M. ROW.
SURFACE CONDENSER.

No. 514,338. Patented Feb. 6, 1894.

Witnesses
G. W. Rea.
Thos. A. Guin

Inventor
Oliver M. Row
By James L. Norris
Atty.

United States Patent Office.

OLIVER MATTHEWS ROW, OF LIVERPOOL, ENGLAND.

SURFACE CONDENSER.

SPECIFICATION forming part of Letters Patent No. 514,338, dated February 6, 1894.

Application filed April 17, 1893. Serial No. 470,730. (No model.) Patented in England September 8, 1891, No. 15,192.

*To all whom it may concern:*

Be it known that I, OLIVER MATTHEWS ROW, a subject of the Queen of Great Britain and Ireland, residing at Liverpool, in the county of Lancaster, England, have invented new and useful Improvements in Surface Condensers, (for which I have obtained Letters Patent in Great Britain, No. 15,192, bearing date September 8, 1891,) of which the following is a specification.

My invention relates to apparatus of the surface heating or cooling type and the objects are to provide apparatus which shall be strong and very efficient in heating, cooling or condensing with comparatively small surfaces. I attain these objects by making use of a tube or tubes indented at intervals on opposite sides, the indentations being preferably at right angles or nearly so alternately; I place these tubes within a casing or container, the interior of the tubes being open to the outside of the casing or container by suitable connections, and cause the fluids, from one to the other of which heat is to be transferred, to pass one through the interior of, and the other over the exterior of such tube or tubes. The currents of fluid striking against the indentations in the tubes are agitated or deflected and broken up, and the transfer of heat is thereby greatly facilitated a much less area of surface being thus needed for a certain quantity of heat transferred than has hitherto been the case.

Referring to the drawings which form a part of this specification, Figure 1 is a vertical section, partly in elevation, on the line A A in Fig. 2 of apparatus illustrative of my invention. Fig. 2 is a horizontal section on the line B. B. in Fig. 1. Figs. 3, 4, 5, 6 and 7 are sections of tubes. Fig. 8 is a section, partly in elevation, and Figs. 9 and 10 are elevations of modifications of apparatus under my invention.

In Figs. 1 and 2 the casing or chamber $a$ contains tubes $b$ formed with indentations, depressions or flats $c$. $c'$.—on opposite sides at intervals in their length such indentations being preferably formed alternately at right angles or nearly so. The chambers $d, e$ communicate with the interior of the tubes $b$ through the nozzles $b'$. The fluid currents pass to and from the chambers $d, e$ through the inlet and outlet $j$; and to and from the casing $a$ through the inlet and outlet $g$ and such fluid currents while passing through and around the tubes $b$ strike against the indentations $c$, $c$ and are deflected, agitated, and broken up, thereby bringing all the particles of such fluids in contact with the walls of the tubes and thus facilitating the transfer of heat.

The above described apparatus is suitable for use as a steam or vapor condenser, a feed or other water heater, or a cooler; and it is preferred that the steam or vapor to be condensed, the heating steam or fluid, or the cooling vapor or fluid should pass through the interior of the tubes while the condensing water or fluid, the water to be heated or the brine or fluid to be cooled are passed around the outside of the tubes, but if desired the passage of the fluids may be arranged vice-versa by suitably proportioning and connecting the inlets and outlets. By constructing the casing $a$ with refractory material or with a water jacket and causing products of combustion of gas or other fuel (either waste products or otherwise) to pass around the tubes $b$ a convenient apparatus will be produced for superheating steam or for heating water.

It will be obvious that the indentations or depressions in the tubes may be varied in many ways in form, position, or length. Fig. 3 is a section showing the indentations touching at the center. In Fig. 4 the bottoms of the indentations are shown corrugated. In Fig. 5 the indentations are formed at other than right angles to each other. In Fig. 1 $c'$ in some of the tubes $b$ are in the form of long flats.

Fig. 6 is a vertical section and Fig. 7 a cross section showing a wire $h$ inserted in an indented tube $b$ in order to prevent accidental closing of such tube by bending or otherwise. In case of the tube becoming expanded the wire $h$ will serve as a guide for restoring it to the desired form.

*a.* The liquid to be heated, evaporated, concentrated, or cooled, passes or circulates around the tube *b* while the heating or cooling fluid is passed through the said tube *b*. *f* is the inlet and outlet to and from the coiled tube *b*, and *g* is the inlet and outlet to and from the container *a*.

Figure 8:
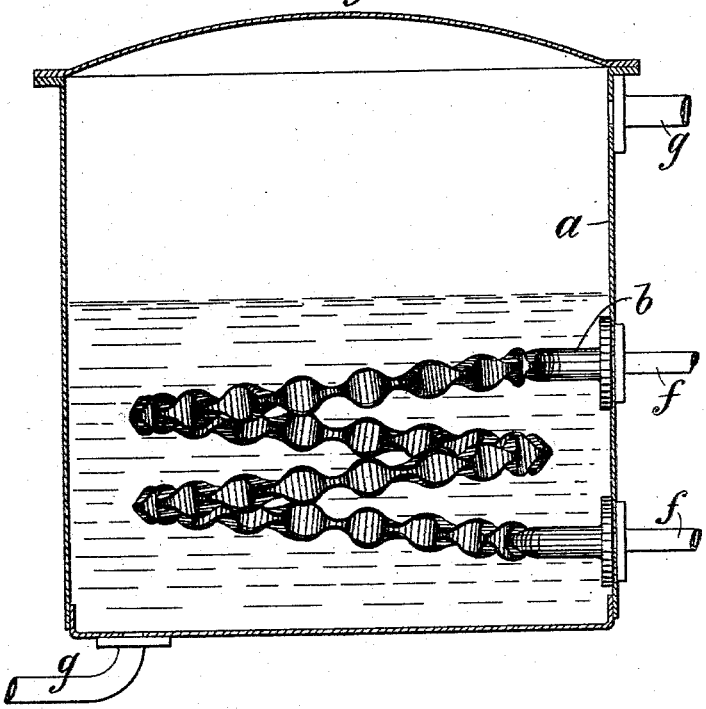
Fig. 8 is a vertical section partly in elevation of apparatus under my invention more particularly applicable for heating, evaporating, concentrating, or cooling liquids. In this modification a single coiled tube $b$ is formed with indentations as described under Fig. 1 and placed in a vessel or contrivance
Figure 9:
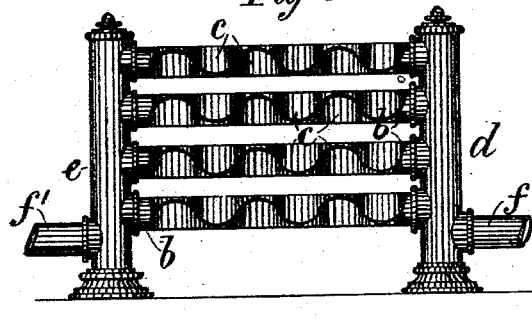

Fig. 9 is an elevation of apparatus under my invention arranged for heating air in rooms or the like preferably by means of hot water. A number of indented tubes *b* are connected at each end to hollow standards *d, e*, and arranged with the indentations *c* at such an angle that there are no spaces in which air or vapor can be retained in the interior of the tubes. The circulating hot water passes from the inlet *f* up one standard *d* through the tubes *b* down the other standard *e* and away by the outlet *f'*.

Figure 10:
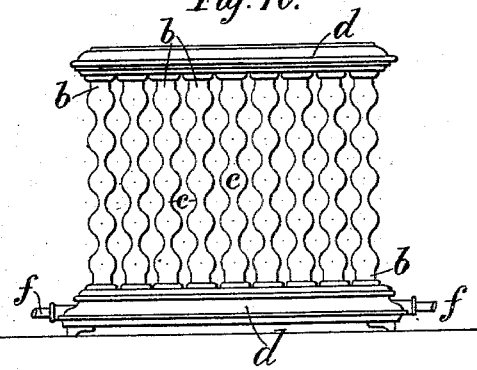

Fig. 10 is an elevation of another form of apparatus under my invention for heating rooms preferably by steam. Here the indented tubes *b* are arranged vertically and connected at top and bottom to chambers *d*. The heating steam passes into and from the chambers *d* and tubes *b* through the inlet and outlet *f f'* in the manner usual in steam heat radiators.

In Figs. 9 and 10 the walls of the room in which the apparatus is placed constitute the casing or container for the fluid to be heated, that is, air which circulates round the outside of the tubes.

The essential feature of my invention consists in the peculiar formation of the tubes, or pipes, which are indented, or pressed inward, at different points in different radial lines, thereby forming, in each tube, a series of similar, communicating sections, the lines of maximum diameter thereof lying in different directions.

It will be obvious that many different arrangements and modifications may be made, according to the purpose for which they are required, without departing from the nature of my invention.

Heretofore and prior to my invention apparatus for condensing steam and heating fluids has been used having pipes corrugated into symmetrical zig-zag, or serpentine form, or into a shape approximating that of a screw having rounded threads. In the former class, the pipes are composed of parallel flat sheets of considerable width, bent into zig-zag, or serpentine form, the bends extending entirely across the sheets and the edges of the latter being set in flanged frames, or otherwise closed. In the latter class the pipes have the form of cylinders provided with circumferential flutings, at regular intervals, thus forming pipes having alternately increased and decreased diameters. I make no claim, therefore to constructions of such character, but

What I claim, and desire to secure by Letters Patent of the United States, is—

1. In an apparatus for heating, cooling or condensing steam, water, or other vapors, or fluids, the combination with a suitable casing, or container, of one or more continuous tubes, or pipes, the walls of which are pressed inward at different points in different radial lines, thereby forming in each tube a series of similar communicating sections, the lines of maximum diameter thereof lying in different directions, substantially as described.

2. In an apparatus for heating, cooling, or condensing steam, water, or other vapors, or fluids, the combination with a suitable casing, or container, of one or more continuous tubes, or pipes, the walls of which are pressed, or indented inward, or toward each other, upon opposite sides of the tube at different points and in different radial lines, thereby forming in each tube a series of similar communicating sections, the lines of maximum diameter thereof lying in different directions, substantially as described.

In testimony whereof I affix my signature to the foregoing specification.

OLIVER MATTHEWS ROW.

Witnesses:
WALTER GUNN,
JOHN I. ROYH.